Patented Aug. 6, 1935

2,010,358

UNITED STATES PATENT OFFICE 2,010,358

PROCESS FOR THE OXIDATION OF ISOALDEHYDES

Herbert Peter Augustus Groll and Miroslav W. Tamele, Berkeley, Calif., assignors to Shell Development Company, San Francisco, Calif., a corporation of Delaware No Drawing. Application February 3, 1933, Serial No. 654,999½

21 Claims. (Cl. 260—116)

Our invention relates to a process for the production of carboxylic acids from aldehydes containing a tertiary carbon atom adjoining the carbonyl group and more particularly is concerned with the production of isobutyric acid and its homologues from isobutyraldehyde and its homologues, respectively, by oxidation of the latter with free oxygen, with or without catalysts. A further feature resides in the oxidation of isoaldehydes, heretofore mentioned in their solutions of fatty acids which may comprise the oxidation product or may be a fatty acid possessing a different number of carbon atoms to the molecule and/or a different atomic structure from that resulting by oxidation of the isoaldehyde. Another novel and specific feature resides in the oxidation of substantially anhydrous isoaldehydes. A still further feature resides in the execution of the process at a temperature below that which was heretofore considered practical. The features heretofore mentioned may be considered severally or in combination.

Other aldehydes, for example, normal butyl aldehyde, have been heretofore converted to the corresponding acids by oxidation with air or other oxygen-containing gas. Greatly to our surprise, it was found that isoaldehydes containing a tertiary carbon atom adjoining the carbonyl group, when subjected to prior art oxidation treatments, were destructively oxidized to carbon monoxide, carbon dioxide, ketone, etc., resulting in very poor yields of acid. For example, isobutyraldehyde, which is the simplest member of the isoaldehydes containing a tertiary carbon atom adjoining the carbonyl group, is destructively oxidized under the same conditions which permit of the oxidation of normal butyl aldehyde to normal butyric acid. The same thing is true of methyl ethyl acetaldehyde and the higher isoaldehydes containing a tertiary carbon atom similarly placed. Entirely different conditions must be established to obtain the smooth oxidation of such isoaldehydes to acids by means of oxygen.

We have found that efficient oxidation of isoaldehydes, of the type referred to, to acid by means of oxygen is possible at temperatures below 45° C. This is well below any temperature specified in existing patents for the oxidation of the normal aldehyde. Further, by operating below 45° C., destructive oxidation is substantially avoided so as to make commercial operation feasible.

The air or oxygen-containing gas should be brought into intimate contact with the isoaldehyde which feature is not attained by merely exposing the isoaldehyde to air. When such intimacy is brought about by methods hereinafter to be described and which are also known to the art, the heat of reaction would bring the aldehyde very quickly to its boiling temperature which is above the allowable temperature. Therefore the temperature should be kept between 25° and 45° C. by artificial cooling. Operating with isobutyraldehyde at approximately 30° C., we have obtained the optimum oxidation rate and yield.

The process can be conducted with or without catalysts. If a catalyst is used, it should be capable of destroying peroxides. Catalysts which are oxygen carriers should preferably be avoided as they are usually too powerful and oxidize the isoaldehyde to carbon monoxide, carbon dioxide, ketone, etc. Suitable catalysts are the salts or oxides of elements of the eighth group of the Periodic Table as well as salts of the rare earths, also said elements themselves. Very good catalysts which not only accelerate oxidation but also increase the yield of acid are platinum black and ferric salts. Cerium, nickel and cobalt salts are also useful, particularly their salts of carboxylic acids.

The various salts of the non-noble metals mentioned can be applied in a variety of ways. Practically any catalytic (peroxide destroying) salt, oxide or element soluble in the resulting acid can be applied with the exception of chlorides which have a detrimental effect on the speed of oxidation.

As an example, it is immaterial whether iron is introduced into the mixture as ferrous or ferric isobutyrate or as ferrous or ferric acetate or as metallic iron (or as ferrous sulfate). It appears that in any case the iron is ultimately converted to ferrous or ferric iron and that iron is catalytically active in this state.

The most useful concentration of platinum black or colloidal platinum is dependent merely on the degree of dispersion, i. e., the available surface of the platinum.

Some other examples of suitable inorganic catalysts are cerium nitrate and vanadium pentoxide.

For the purpose of maintaining a desirable speed of reaction, it is preferable to employ partial pressures of oxygen above that of atmospheric air, i. e., either gases containing more oxygen than air such as pure oxygen or 22 to 80% oxygen or greater such as may be obtained as by-product in preparing pure nitrogen for the production of ammonia, or air or gases richer in oxygen under pressures above atmospheric, e. g., under about ten atmospheres.

As the aldehyde operated upon is oxidized, the corresponding acid is produced and the remaining aldehyde generally is soluble therein, but continues to oxidize to completion in spite of the fact that towards the end of the oxidation it is present as a dilute solution of aldehyde in acid. In fact, the presence of the organic acid as a solvent has a certain advantage in that it makes the reaction more controllable by acting as a solvent or diluent, and we prefer to have present a certain amount of an organic acid at all stages of the oxidation process.

The rate of oxygen absorption in isoaldehydes is highest when the aldehyde is concentrated. The rate gradually drops with decreasing aldehyde concentration. This drop becomes quite rapid between about 45% and 25% aldehyde in the reaction mixture. Below about 10% aldehyde concentration, the reaction becomes so slow that an unreasonably long reaction time would be necessary to effect completion of the reaction.

The acid employed as solvent need not correspond to the end-product acid, but may be one of different boiling temperature. Any of the carboxylic acids as formic, acetic, propionic, normal- or isobutyric, normal- or isovaleric, methylethyl acetic acids and the like may be used. Thus when acetic acid, for example is employed as a diluent for isobutyraldehyde, the isobutyric acid produced may be readily separated from the acetic acid by distillation. A special advantage of the use of different acids arises when the acid produced by oxidation of the aldehyde is a solid, e. g., α,α'-dimethyl adipic acid or phenyl isobutyric acid (αmethyl hydrocinnamic acid). We therefore may use lower boiling liquid fatty acids as solvents for the aldehyde and acid during the oxidation in order to prevent solidification of the reaction mixture.

When working with comparatively low-boiling acids and aldehydes, the presence of unchanged aldehyde in the oxidation product also facilitates dehydration of the acid formed. The binary azeotrope of aldehyde and water possesses a lower boiling temperature than that of the binary acid-water azeotrope and if substantially anhydrous materials are resorted to (which will be discussed later) the distillation of the binary aldehyde-water azeotrope will facilitate dehydration of the acid. Thus the reaction is preferably carried out in such a way that a product still containing about 10% to 40% aldehyde is withdrawn from the oxidizing apparatus. If the oxidation is carried out as a batch or semi-continuous (intermittent) process, it may be desirable to allow the reaction to proceed until only 7% or even 5% aldehyde remains unchanged, but if a continuous process is applied it is best to withdraw a product containing about 10% to 40% of unchanged aldehyde. Above this concentration, inconvenience of having to redistill a large amount of aldehyde from the product would largely nullify the concurrent gain in reaction velocity.

An advantageous operating condition which should be noted is the execution of the process with substantially anhydrous materials although the invention is not limited to this feature. When the aqueous content of the aldehyde is small, we have found that the reaction proceeds faster and with better yields of acid. The presence of some water is not in itself fatal, in fact amounts varying up to about 5% can be easily tolerated. The presence of water in the aldehyde should be considered only from a practical standpoint. For example, isobutyric acid is difficult to recover from an aqueous solution due to the formation of an azeotropic homogeneous mixture with 79% water. It is therefore preferable to exclude all water in excess of that required as described later for the purification of the acid. If substantially anhydrous aldehyde is oxidized, these traces are easily removed from the reaction product provided there is some aldehyde left unchanged which, on fractionation, carries the water over as azeotropic mixture. This suggests that the water content of the aldehyde feed should be kept so low that all of the water, i. e., both original moisture and water formed by side reactions during oxidation can be removed as a constant boiling mixture of the unchanged aldehyde. There is therefore an important advantage in using not more water than can be removed as a constant boiling mixture with the unchanged aldehyde.

We have further found that very small amounts of organic halides act as powerful retardants to oxidation and all but traces should be absent from the aldehydes intended for use in our process.

The difficulties which distinguish the oxidation of isoaldehydes in question from that of normal aldehydes are due to the comparative ease with which the group

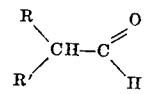

(R, R' representing organic groupings such as alkyl, aryl or aralkyl, which may be further substituted) is attacked by oxygen with rupture of the linkage between the aldehyde group and the tertiary carbon atom. For that reason, methyl ethyl acetaldehyde of the structure

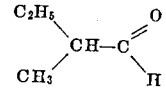

is equally unstable and is also best oxidized under the conditions described.

Although reference will be had to the oxidation of isobutyraldehyde, it is not to be construed as limitative, but rather illustrative of the isoaldehydes in question since we are concerned with a reaction characteristic of a group regardless of the exact number of carbon atoms contained in the molecule of each species member or the cyclic or open-chain arrangement of the atoms as long as the following structure is present

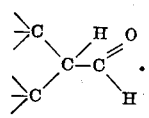

Example I

Oxidation was carried out in a vertical glass tower fitted with an aluminum cooling coil. The liquid charge was circulated by an acid proof pump and injected at the bottom of the tower. By suction created by the injector, oxygen was drawn into the liquid in the form of innumerable small bubbles.

The tower was charged with 2.73 kg. of isobutyric acid, 1.17 kg. of isobutyraldehyde and a small amount of iron isobutyrate (0.005% by weight). As soon as the pump was set in motion, absorption of oxygen took place which soon remained steady at 3.0 cu. ft. per hour. Aldehyde was then added at a steady rate corresponding to the absorption of oxygen, and the liquid product was drawn out of the reactor at a corresponding rate. The temperature of the liquid was kept at 30° C. From time to time a small amount of gas was vented at the top of the tower. In 6¾ hours the process was stopped.

During 6¾ hours a total of 4.79 kg. of isobutyraldehyde were added and 580 liters of oxygen were used up in the reaction. Altogether fourteen liters of gas were vented at the top of the tower. All the liquid was drained out of the reactor and combined with the product drawn off during the run.

The total reaction product weighed 9.31 kg. of which 2.69 kg. were unchanged aldehyde and 6.48 kg. were isobutyric acid. The difference was due to by-products and various losses. The isobutyric acid produced in the process was therefore 3.75 kg., and the aldehyde used up was 3.27 kg., or a yield of 94% on the isobutyraldehyde consumed.

The entrainment of the oxygen in the manner described in the example leads to increased surface action thereby decreasing the time of reaction.

A conventional fractionating column may be employed continuously, intermittently or in batch fashion to separate the isoacid from the unchanged isoaldehyde. The latter may be returned to the oxidizing unit either alone or together with some of the acid produced. The acid itself may be distilled in order to separate it from the catalyst.

Some general methods of operation are described below:

*Example II*

Isoaldehyde, either substantially anhydrous, or containing a varying amount of water which can be tolerated which includes its constant boiling mixture with water and also the isoaldehyde phase resulting from the distillation, condensation and stratification of a binary isoaldehyde-water azeotrope, is placed in a large vessel. A catalyst such as platinum black, or a peroxide-destroying metal salt which is soluble in the isoacid, such as ferric or cerium salts, is added and air or oxygen is blown through in fine bubbles or with rapid agitation, while the contents of the vessel are kept around 30° C. When the concentration of isoacid has been built up to a practical value the charge is withdrawn and fractionated. The vessel is ready for a fresh charge.

*Example III*

Isoaldehyde of the character previously described, with or without a catalyst, is fed into the top of a packed tower. An oxygen-containing gas is passed countercurrently or concurrently with the isoaldehyde through the tower. The temperature should be kept below 50° C., preferably below 45° C. Conditions are adjusted so that the concentration of acid in the liquid at the bottom of the tower, or, if a series of towers is applied, of the last tower, is high enough for an economic recovery of the acid.

*Example IV*

A continuous system is worked in which partly oxidized mixture is present in the oxidizing apparatus, part of it being withdrawn continuously or intermittently as product and an equivalent amount of fresh isoaldehyde added. This principle may be worked in a variety of ways:

(a) as in Example II, fresh isoaldehyde being added to the vessel during operation;

(b) as described in Example III, the mixture being recirculated over the top of the tower. The fresh isoaldehyde may be mixed with the recirculated liquid either before its entry into the tower or in the tower proper;

(c) in a continuous injector system as described in Example I; a circulating pump being used to return to the oxygen inlet any unabsorbed oxygen issuing from the top of the tower.

(d) in several other systems such as a chamber filled with an oxygen containing gas into which the acid-aldehyde mixture is sprayed or in a rotary pump wherein the aldehyde-acid mixture is churned up with oxygen, etc.

*Example V*

73 lbs. of a mixture of 2, 4, 4 trimethyl valeraldehyde-1 and tertiary butyl isopropyl ketone which had been made by rearrangement with diluted sulfuric acid of the mixture of unsaturated alcohols obtained by hydrolysis of chlorinated di-isobutylene was dissolved in 73 lbs. of acetic acid and 0.0073 lbs. of iron (as isobutyrate) added. The mixture was stirred rapidly in a glass lined kettle and oxygen blown into it while the temperature was maintained at 35 C. by cooling. The reaction proceeded rapidly until about 50 ft.$^3$ oxygen were consumed. Then the mixture was fractionated from the same kettle. The first cut boiling from 100 to 120 C. consisted of acetic acid. Then the distillation was continued under vacuum. From 45–75° C. under 8 mm. hg. pressure a cut was distilling containing little acid, much ketone and a small amount of unchanged aldehyde. The residue boiling above 80° C. under 8 mm. hg. pressure containing 60% free acid and 15% acid in form of an unidentified ester. The mixture was boiled with an equivalent amount of aqueous sodium hydroxide, the unsaponifiable oil and the iron hydroxide separated and the salt recovered by evaporation of the water. 41 lbs. of the soap-like sodium isooctylate were recovered.

*Example VI*

1420 grams of 2-, 5-dimethyl hexanedial-1,6 made by rearrangement of di-isobutenyl dioxide was dissolved in 3000 cc. of glacial acetic acid and 0.3 grams platinum black added. The mixture was charged into an aluminum lined autoclave and air under 5 atmospheres pressure pumped through the mixture while the temperature was maintained at 30–35° C. by means of a cooling coil inserted into the autoclave. When about 90–100 liters of oxygen were consumed from the air passed through the apparatus, the mixture was pressed through a filter. The precipitated crude α,α′, dimethyl adipic acid was removed from the filter, dissolved in hot water, filtered hot from the platinum black, and recrystallized by cooling. A high purity acid was obtained in this manner. The filtrate consisting of acetic acid, some unchanged aldehyde, polymer and some dimethyl adipic acid was filled up to 3000 cc. with fresh acetic acid, returned to the apparatus, another batch of 1420 grams of 2-, 5-dimethyl hexanedial 1,6, and the recovered platinum black added and the above described procedure repeated. The overall yield of α,α′,dimethyl adipic acid was 80%.

*Example VII*

148 grams of βphenyl isobutyraldehyde was dissolved in 200 cc. iso-butyric acid in a 2000 cc.

glass flask equipped with a sealed rapid stirrer of such design that draws the gas from the upper part of the flask into the liquid, 0.1 gram of iron (as isobutyrate) was added and then oxygen was bubbled into the flask while stirring the contents. By surrounding the flask with a bath of cold water and adjusting the rate of the oxygen feed the temperature of the mixture was kept at about 30° C. When 10 liters of oxygen were consumed more βphenyl isobutyraldehyde was gradually introduced into the flask at such a rate that 13.2 grams aldehyde were added per liter of oxygen consumed. The addition of aldehyde was discontinued when a total of 1030 grams aldehyde including the first 148 grams had been added. The oxygen supply was continued until 75 liters oxygen were consumed. The contents of the flask were transferred into a still and fractionated under vacuum. The fraction boiling up to 155° C. under 20 mm. hg. pressure was mainly isobutyric acid, some unchanged aldehyde and by-products. The main fraction, boiling from 155-175° C. under 20 mm. hg. pressure was collected separately and after crystallization from aqueous alcohol had a melting point of 37.1° C. About 900 grams of pure αmethyl hydrocinnamic acid were recovered.

*Example VIII*

In the same apparatus and with the same procedure as described in Example VII, a total of 1000 grams of hydratropic aldehyde was oxidized in the manner described in Example VII in presence of 200 cc. isobutyric acid and 0.05 grams iron (as isobutyrate). The product was fractionated at atmospheric pressure. The fraction boiling from 250°-270° C. was fairly pure hydratropic acid. 880 grams of the crude acid were recovered.

Isobutyric acid and the higher iso-acids made by oxidation of isoaldehydes contain non-acidic impurities which cannot be removed completely by straight fractionation. These impurities varying from a fraction of a percent to as much as 5% are objectionable if the acids are used for certain industrial purposes, for instance, for manufacture of cellulose esters. In this process the impurities react with sulfuric acid and cause a discoloration of the product.

It was found that these products are most probably polymerization or condensation products of the aldehyde from which the acid had been prepared. The exact nature of the impurities is, however, immaterial. We have found two methods by which these impurities can be removed using either of the two methods or a combination thereof.

(1) Bulk of the impurities can be removed by adding a certain small amount of water to the acid and fractionating an azeotropic mixture of water with the impurities off the acid. By this method the amount of the impurities may be greatly reduced, but they cannot be completely removed.

(2) Therefore it is advantageous to use a chemical method for removal of the last traces. It was found that complete purification can be achieved by applying an oxidizing agent more powerful in character than atmospheric oxygen to the impure acid in amounts equivalent or slightly in excess of the amount of impurities present. Such oxidizing agents are for instance: hydrogen peroxide, ozone, permanganates, hausmannite, nitric acid, etc. According to the nature of the oxidizing agent the conditions of the refining operation must be varied. Thus ozone is passed into the acid at low temperatures between about 0° C. and atmospheric temperature, permanganate is applied around atmospheric temperature, hydrogen peroxide, nitric acid, and manganese oxides are applied to the acid boiling under reflux.

After the refining operation the acid must be freed from the reaction products of the refining agent unless these products are gaseous as in the case of ozone. This final purification logically must be adjusted to the character of the refining agent. For instance, if permanganate or manganic oxides were used, the acid is distilled off the salt. If nitric acid was applied, the acid may be freed from excess nitric acid and nitrogen peroxide by adding a corresponding amount of metallic iron or ferrous salt, heating and removing the nitrous oxide by boiling. Some inert gas may be passed through the acid to quicken the removal of NO. Then the acid is distilled off the iron salt. The distillate is isobutyric acid or other iso-acid of high purity.

For illustrative purposes only, reference will be had to the purification of isobutyric acid which is the simplest member of the class and characteristic in behavior of the higher members which contain upwards of 5, 6 and 7 carbon atoms to the molecule.

*Example IX*

100 kg. of crude isobutyric acid containing 4% impurities were put in a glass lined kettle. 4 kg. of water and 4.3 kg. of 70% nitric acid were added. The charge was then fractionated. First low boiling fraction contained mostly water, some unchanged impurities, a little isobutyric acid and nitrous oxide. The isobutyric acid fraction (97 kg.) was water white and consisted of practically only isobutyric acid with small traces of nitrogen compounds.

*Example X*

100 kg. of crude isobutyric acid containing 4% impurities was fractionated with an addition of 3.2 kg. of 30% hydrogen peroxide solution.

The first (aqueous) fraction (about 5% by weight) was yellow colored and consisted mostly of water and isobutyric acid and unchanged impurities. The rest of the charge was water white and could be used directly without further fractionation. About two thirds of the impurities originally present were thus removed. By repeating the treatment with 1 kg. of 30% hydrogen peroxide, 90 kg. of chemically pure isobutyric acid were obtained.

*Example XI*

To 100 kgs. of crude isobutyric acid containing 5.6% of impurities, 3.0 kg. of potassium permanganate dissolved in 5 kg. of water were added. The mixture was immediately fractionated.

The first fraction (about 10% by wt.) was aqueous and boiled between 99-146° C. The second fraction (87 kg.) was isobutyric acid with only 1% impurities.

*Example XII*

To 100 kg. of crude isobutyric acid containing 6% of impurities, were added 6.5 kg. of 70% nitric acid and the mixture brought up to 150° C. After expelling most of the nitrous gases, 2.2 kg. of iron powder were added and the acid was fractionated. The first fraction was yellowish green and contained water (about 5% by wt. of all the charge) and distilled between 97-140° C. The rest (90 kg.) of the acid distilled at its true boiling point and did not contain any more than 0.8% of impurities.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:

1. A process for producing a carboxylic acid from an aldehyde which has a tertiary carbon atom adjoining the aldehyde group which comprises oxidizing the said aldehyde with elementary oxygen in the presence of an aliphatic carboxylic acid at a partial pressure of oxygen more than one-fifth of an atmosphere.

2. A process for producing a carboxylic acid from an aldehyde which has a tertiary carbon atom adjoining the aldehyde group which comprises oxidizing the said aldehyde with elementary oxygen in the presence of a carboxylic acid at a partial pressure of oxygen more than one-fifth of an atmosphere at a reaction temperature not substantially exceeding 45° C.

3. A process for producing a carboxylic acid from an aldehyde which has a tertiary carbon atom adjoining the aldehyde group which comprises oxidizing the said aldehyde with elementary oxygen at a reaction temperature not substantially exceeding 45° C. at a partial pressure of oxygen more than one-fifth of an atmosphere.

4. A process for producing a carboxylic acid from an aldehyde which has a tertiary carbon atom adjoining the aldehyde group which comprises oxidizing the said aldehyde in the presence of a quantity of water not exceeding that in the aldehyde-water constant boiling mixture with elementary oxygen.

5. A process for producing a carboxylic acid from an aldehyde which has a tertiary carbon atom adjoining the aldehyde group which comprises oxidizing part of said aldehyde with elementary oxygen, removing part of the acid-aldehyde mixture from the sphere of reaction and distilling off a constant boiling mixture of isoaldehyde and water from said acid-aldehyde mixture.

6. A process for producing a carboxylic acid from an aldehyde which has a tertiary carbon atom adjoining the aldehyde group which comprises oxidizing part of said aldehyde with elementary oxygen, removing part of the acid-aldehyde mixture from the sphere of reaction and distilling off a constant boiling mixture of isoaldehyde and water from said acid-aldehyde mixture, the quantity of water in the acid-aldehyde mixture being capable of substantially complete removal as azeotrope.

7. The step of reducing the aqueous content of an isocarboxylic acid containing water which comprises subjecting said acid to distillation in the presence of an aldehyde which forms a constant boiling mixture with water and removing the binary aldehyde-water azeotrope.

8. A process for producing a carboxylic acid from an aldehyde which has a tertiary carbon atom adjoining the aldehyde group which comprises oxidizing the said aldehyde with elementary oxygen in the presence of a carboxylic acid while continuously introducing more of said aldehyde and a carboxylic acid into the sphere of reaction.

9. A continuous process for producing a carboxylic acid from an aldehyde which has a tertiary carbon atom adjoining the aldehyde group which comprises oxidizing a solution of said aldehyde in a fatty acid, maintaining the concentration of said aldehyde between about 10% to 45% by the controlled introduction of isoaldehyde into said solution, periodically removing an acid solution containing some unchanged isoaldehyde and an isoacid which is the oxidation product and recovering the isoacid thus formed.

10. A process for producing an aliphatic carboxylic acid from an aliphatic aldehyde which has a tertiary carbon atom adjoining the aldehyde group which comprises oxidizing said aliphatic isoaldehyde with elementary oxygen at a reaction temperature not substantially exceeding 45° C. at a partial pressure of oxygen more than one-fifth of an atmosphere.

11. A process for producing a carboxylic acid from an aldehyde which has a tertiary carbon atom adjoining the aldehyde group which comprises oxidizing the said aldehyde in the liquid phase with elementary oxygen, a current of liquid aldehyde inducing the injection of an oxygen-containing gas into the isoaldehyde.

12. A process for producing a carboxylic acid from an aldehyde which has a tertiary carbon atom adjoining the aldehyde group which comprises oxidizing the said aldehyde in the liquid phase with elementary oxygen, removing part of the resulting acid-aldehyde mixture from the sphere of reaction and subsequently returning it to the sphere of reaction and utilizing the cycled acid-aldehyde mixture as a current to induce the injection of oxygen into the aldehyde undergoing oxidation.

13. In a process where an aliphatic, saturated isoacid is prepared by the oxidation with elementary oxygen of an aldehyde containing a tertiary carbon atom adjoining the carbonyl group, the step which comprises adding water to the crude isoacid thus obtained and distilling off a mixture containing water and impurities present in the crude acid.

14. In a process where an aliphatic, saturated isoacid is prepared by the oxidation with elementary oxygen of an aldehyde containing a tertiary carbon atom adjoining the carbonyl group, the step which comprises subjecting the crude acid thus obtained to the action of an oxidizing agent in an amount not less than the equivalent of the impurities present.

15. A process for the oxidation of an isoaldehyde to its corresponding acid in the liquid phase, characterized in that the oxidation is effected in such a manner that the concentration of the corresponding acid does not attain such value that relatively vigorous reaction is prevented and the corresponding isoacid is recovered from the resulting reaction liquor.

16. The process for the continuous oxidation of an isoaldehyde to its corresponding isoacid in the liquid phase, characterized in that the reaction liquor is maintained at such concentration of isoacid that the reaction is at least relatively vigorous, fresh aldehyde being added to the liquor and the reaction liquor being withdrawn to maintain the liquor undergoing reaction at the desired concentration of isoacid, the liquor withdrawn being subjected to treatment to recover the isoacid contained therein.

17. The process according to claim 15, wherein gases escaping from the reaction vessel are subjected to scrubbing by a liquid comprising isoacid, and the scrubbings caused to scrub the vapor space above the reaction liquor.

18. The process according to claim 15, wherein gases escaping from the reaction vessel are subjected to scrubbing with a portion of the reaction liquor and the scrubbings caused to scrub the vapor space above the body of the reaction liquor.

19. The process for the production of isoacid by oxidizing its corresponding isoaldehyde in the liquid phase, characterized in that the isoacid formed is only allowed to attain a concentration in the reaction liquor of less than 90% and is separated from the reaction liquor.

20. The process for the production of an isoacid by oxidizing its corresponding isoaldehyde in the liquid phase, characterized in that the isoacid in the reaction liquor is maintained at a concentration of between 90% and 55% and isoacid is separated from the reaction liquor produced.

21. The method of manufacturing an isoacid from its corresponding isoaldehyde which comprises effecting a reaction between the aldehyde and oxygen in the presence of a peroxide-destroying catalyst soluble in the corresponding isoaldehyde while maintaining a temperature below 45° C.

HERBERT PETER AUGUSTUS GROLL.
MIROSLAV W. TAMELE.